United States Patent [19]

Somm

[11] Patent Number: 5,184,650
[45] Date of Patent: Feb. 9, 1993

[54] LOOM HAVING A RESILIENT LOCKING ELEMENT FOR THE CLOTH BEAM BEARING

[75] Inventor: Christopher Somm, Dietlikon, Switzerland

[73] Assignee: Sulzer Brothers Limited, Winterthur, Switzerland

[21] Appl. No.: 598,684

[22] PCT Filed: Feb. 26, 1990

[86] PCT No.: PCT/CH90/00043
§ 371 Date: Oct. 10, 1990
§ 102(e) Date: Oct. 10, 1990

[87] PCT Pub. No.: WO90/10742
PCT Pub. Date: Sep. 20, 1990

[30] Foreign Application Priority Data

Mar. 10, 1990 [CH] Switzerland ............ 00909/89

[51] Int. Cl.⁵ .................... D03D 49/20; D03D 49/00
[52] U.S. Cl. ................ 139/308; 139/1 R; 384/436; 242/55.1; 403/330
[58] Field of Search ........... 403/329, 330; 384/435, 384/436; 242/65, 55.1; 139/1 R, 308; 24/647; 74/532, 533, 534, 536, 539, 540, 541

[56] References Cited

U.S. PATENT DOCUMENTS

| | | |
|---|---|---|
| 1,803,286 | 4/1931 | Thatcher . |
| 2,510,454 | 6/1950 | Zabriskie et al. ............ 139/308 |
| 2,989,257 | 6/1961 | Schuler et al. ............ 242/65 |
| 3,532,137 | 10/1970 | Fransen . |
| 3,884,274 | 5/1975 | Sujdak . |

FOREIGN PATENT DOCUMENTS 1098457 1/1961 Fed. Rep. of Germany .

*Primary Examiner*—Andrew M. Falik
*Attorney, Agent, or Firm*—Kenyon & Kenyon

[57] ABSTRACT

To secure a cloth beam (2) of a loom in an open bearing shell (6) a resiliently borne tongue (7) is provided. The tongue includes a nosing (11) between two arms (10, 12) and is connected at one end of the first arm (10) to a bearing table (5). The nosing (11) secures a cloth beam journal (4) in the bearing. When the tongue (7) is pivoted by a lever (14) on the second arm (12) of the tongue (7), the nosing (11) moves away from the shell (6) so that the journal (4) can be moved out of the shell. Satisfactory securing of the journal (4) is therefore provided and the cloth beam (2) can be changed readily without the use of tools.

22 Claims, 5 Drawing Sheets

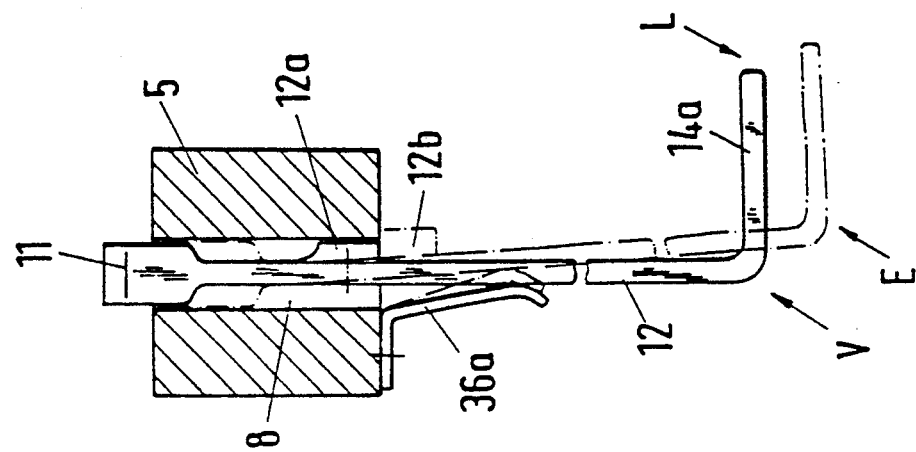
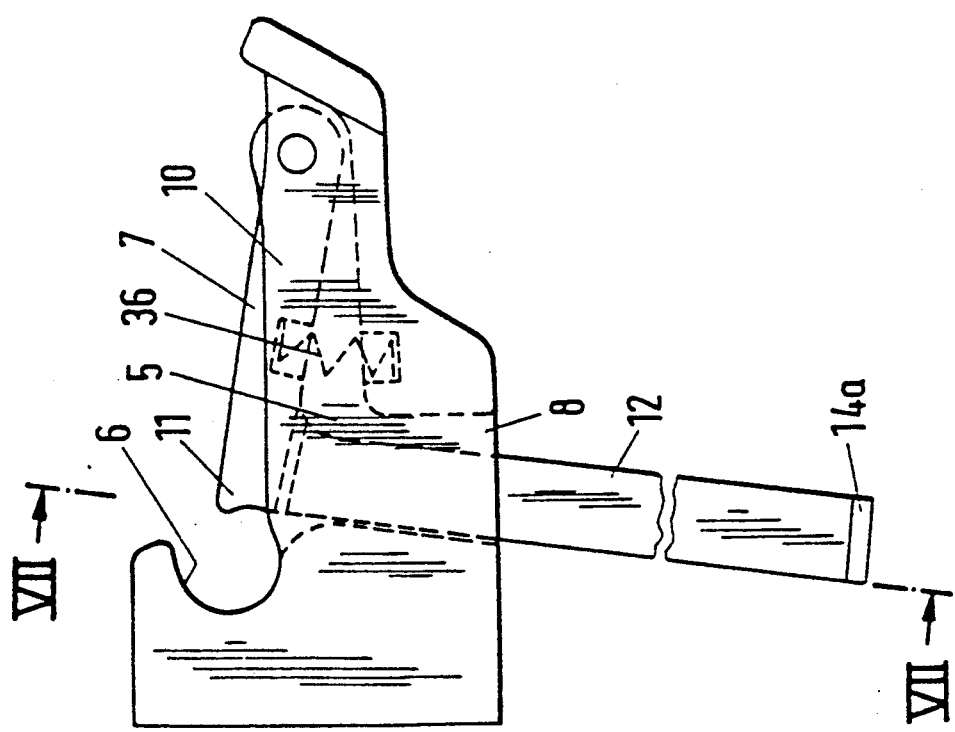

LOOM HAVING A RESILIENT LOCKING ELEMENT FOR THE CLOTH BEAM BEARING

The invention relates to a bearing for a cloth beam of a loom.

In most looms, the warp yarns are wound on warp beams and brought to a loom to be woven and the warp beams, may be of substantial dimensions and weight. At the loom end remote from the warp beam, the woven cloth is wound on a cloth beam which is removed from the loom periodically when the cloth beam has reached its maximum permissible diameter. The cloth beam usually has to be changed several times during the weaving of the warps of a single warp beam and if at all possible the loom should not have to be stopped for cloth beam changing.

Considerable importance therefore attaches more particularly to the mounting of the cloth beam. First, the mounting should be such that the cloth beam journal cannot slide out of its bearing while cloth is being wound on. On the other hand, it should be possible to remove the cloth beam rapidly since the time available in known looms for cloth beam changing is limited.

For example, U.S. Pat. No. 3,884,274 discloses a cloth beam bearing in the operative position of which a sleeve for bearing journals bears on a bolt or the like. The bolt, in turn, rests on a pedestal movable by a screwthreaded spindle which is rotated to either raise or lower the bolt by way of the pedestal. Considerable time is required to turn the spindle; also, it would be impossible to have automatic removal of the cloth beam by a robot in the manner disclosed in EP-A-0 296 115, separate controls having to be provided to actuate the spindle.

It is an object of the invention to devise a loom of the kind set out in which the cloth beam can be secured in its bearing in a simple manner and release of such securing is simplified and should be performable by automatic removal devices.

Briefly, the invention provides a bearing for a cloth beam of a loom wherein the cloth beam has journals for rotatably mounting the cloth beam in place. In accordance with the invention, the bearing has a bearing table having a bearing shell for rotatably receiving a journal of a cloth beam and a recess extending from the shell. In addition, a tongue is secured at one end to the table and extends within the recess with a nosing facing the shell for slidably engaging a cloth beam journal received in the shell. Still further, a means is provided for moving the tongue between a first position in the recess to permit movement of a cloth beam journal into and out of the shell and a second position out of the recess to slidably engage the nosing with a cloth beam journal in the shell.

In one embodiment, the tongue is resilient and is rigidly secured to the table at one end. In this embodiment, the tongue may be curved so as to occupy the second position when at rest. Thus, the tongue can be restored automatically to this closed or locking position, and thus, requires no adjusting elements of its own for this purpose. In addition, an arm extends from the nosing through the table and has a support surface for engaging the table in the second position (closed position) of the tongue in order to counteract movement of the tongue from the second position in a direction opposite from the first position.

In another embodiment, a spring is disposed between the table and the tongue for biasing the tongue from the first position (opening position) into the second position (closed position).

Preferably, the arm which extends downwardly out of the recess is connected to a lever for release. The idea is more particularly not automatic but manual release. In one embodiment, the lever is pivoted to the table at a pivot place and engages the tongue arm at one end of the tongue by way of a pivot arm. The other part of the lever beyond the pivot place is in the form of a grip; corresponding means for locking the grip in a predetermined required position are of course feasible.

However, for automatic cloth beam removal a finger is associated with the tongue and presses the same into the recess. This can occur, for example, in dependence upon the movement of a cloth beam extractor disclosed in EP-A-0 296 115. To this end, the corresponding finger is connected to a gripper of the extractor and acts in dependence upon the movement thereof on the resilient tongue. The action occurs when the gripper is already engaging the cloth beam so that the same can be transferred directly from the bearing shell to the extractor.

Another possibility is for the finger to act on the tongue under the control of an independent drive. Here too the action occurs only when the extractor already has a firm grip on the cloth beam.

This simple construction greatly simplifies removal of the cloth beam with the loom running.

Also, to facilitate the introduction of a new cloth beam the journal can simply snap into position behind the resilient tongue, whereafter the restoring force thereof closes the bearing automatically.

Should the cloth beam have to run backwards, the cloth beam mounting provides a non-positive retention. Tolerances can be substantial.

Other advantages, features and details of the invention will become apparent from the following description of preferred embodiments and with reference to the drawings wherein:

FIG. 1 diagrammatically illustrates a side view of a part of a loom near the cloth beam mounting;

FIG. 2 diagrammatically shows a side view of the same part as in FIG. 1 but in a different operative position;

FIG. 7a illustrates a side view of a modified bearing in accordance with the invention;

FIG. 7b illustrates a view taken on line VII—VII of FIG. 7a; and

FIG. 7c illustrates a further modification employing a foot stirrup on a lever of the bearing of FIG. 7a.

Figure 1:
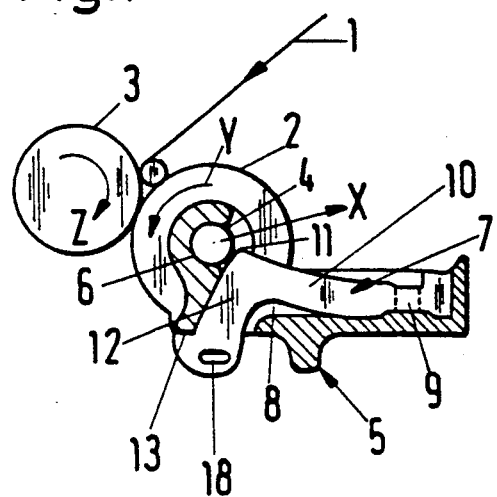

Referring to FIG. 1, cloth 1 woven on a loom (not shown in further detail) is wound on a cloth beam 2 which is removed from the loom periodically when the wound-on cloth 1 has reached a maximum permissible diameter. A driving wheel 3 rotating in a direction indicated by an arrow z is associated with the cloth beam 2 to wind on the cloth 1.

Figure 3:
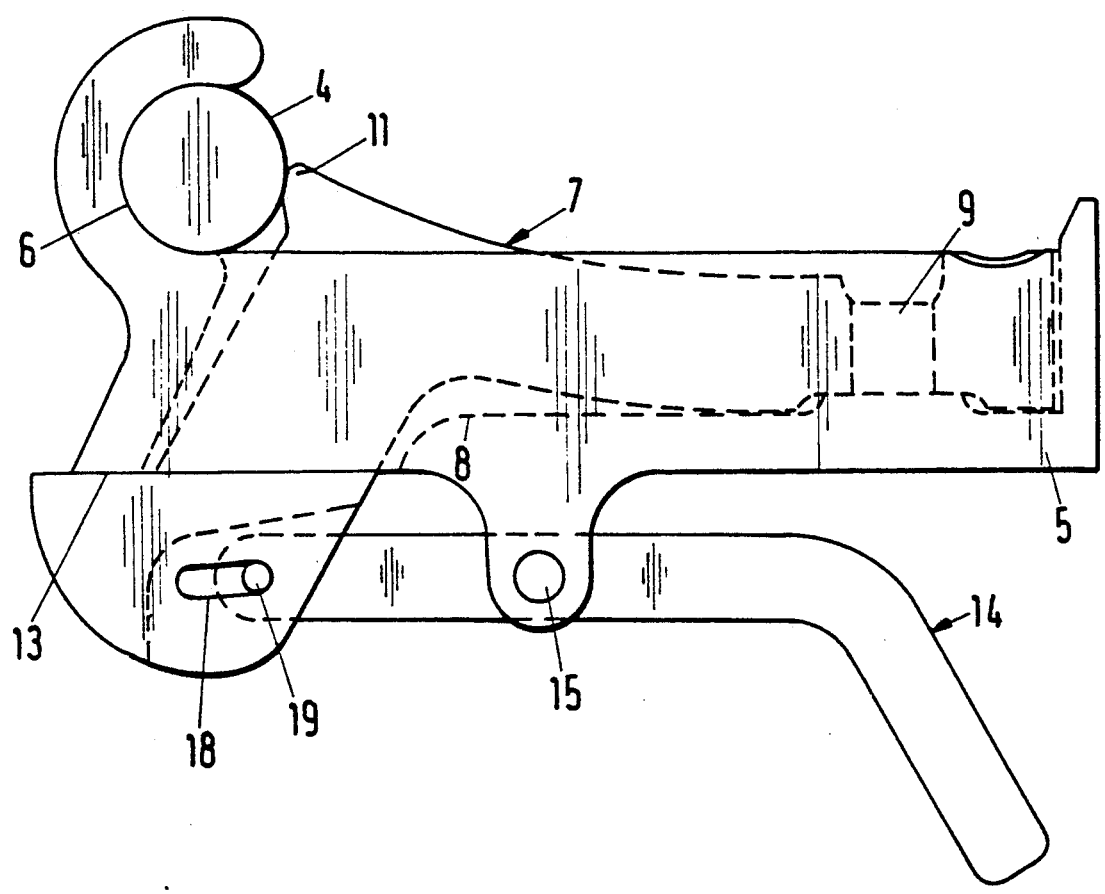
FIG. 3 is a side view to an enlarged scale of the combined elements of a cloth beam bearing according to the invention.

Projecting from each end of the cloth beam 2 is a bearing journal 4 which in the operative position is received in a bearing shell 6 formed by a bearing table 5 of a bearing. A resilient tongue 7 engaged in a slot-like recess 8 in table 5 prevents journal 4 from slipping out of shell 6. As indicated in FIGS. 1 and 3, the tongue 7 is rigidly secured at one end to table 5, for which purpose securing elements can extend through a bore 9 in tongue 7. An arm 10 of tongue 7 extends with an upward curvature from the mounting and forms a nosing 11 on which journal 4 bears. From the nosing 11 a second arm 12 of the tongue 7 extends downwardly through the table 5 and engages the same from below by way of a support surface 13.

The cloth beam bearing is in the closed state in FIG. 1. When the cloth beam is winding on cloth 1 in normal operation, the journal 4 tends to move out in a radial direction x, striking as it does so a nosing 11 of tongue 7, the surface 13 below the bearing producing a counter torque. This closure acts as a positive device for all the static loads occurring. The direction y of rotation of the cloth beam 2 always tends to retain the tongue 7 in its locked position by frictional engagement and positive engagement.

Figure 2:
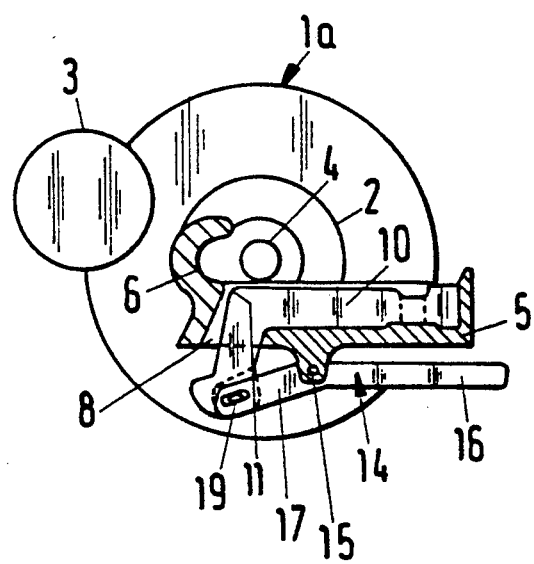

To extract the cloth beam 2 with the cloth 1a wound on it, the tongue 7—i.e., the arm 10—is, as shown in FIG. 2, bent straight so that the nosing 11 retracts into the recess 8; consequently the journal 4 can slide out of the shell 6.

For the sake of simplicity, this release is effected by means of a lever 14 which is pivoted to the table 5 at a place 15. The lever 14 has on one side of the place 15 a grip 16 and on the other side a pivot arm 17 which is connected to the tongue arm 12. To this end, the arm 12 is formed with a slot 18 in which a corresponding pin 19 of the arm 17 engages.

Locking means can be associated, if required, for example, with the grip 16 to keep the tongue 7 open. In the absence of any such device, the stored return energy in the tongue 7 closes the bearing automatically, although a cloth beam can be inserted even when the bearing is in its closed position since the resilient tongue 7 yields under the pressure of a journal 4 which it is required to press into the shell 6.

Figure 4:
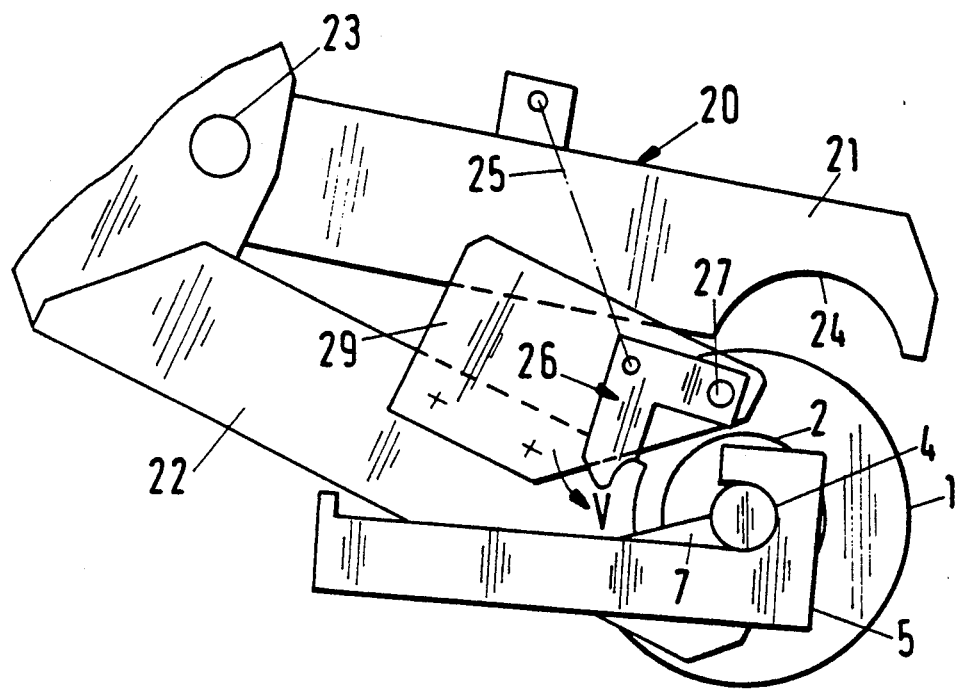
FIG. 4 is a diagrammatic side view of a loom near the cloth beam bearing with the extractor engaging.

FIG. 3 shows the discrete elements of this self-closing cloth beam bearing in greater detail. The bearing can be used very effectively in co-operation with a cloth beam extractor 20 described in EP-A-0 296 115. As can be seen in FIG. 4, such an extractor 20 comprises two grippers 21, 22, the gripper 21 being movable around a pivot 23 relative to the gripper 22. Both grippers 21, 22 are formed with a shell-like recess 24 by way of which they engage around the cloth beam 2 in the closed position.

In the embodiment shown in FIG. 4 the top gripper 21 is connected to a finger 26 by way of a lever mechanism 25 shown merely in chain-dotted line. The finger 26 is mounted on a pivot 27 disposed in a plate 29 secured to the bottom gripper 22. When the moving gripper 21 closes, the finger 26 is pivoted around the pivot 27 in the direction V strikes the resilient tongue 7 and presses the same into the table 5. The movement of the finger 26 is so controlled that the tongue 7 fully releases the journal 4 only when the grippers 21, 22 are engaged firmly around the cloth beam 2.

Figure 5:
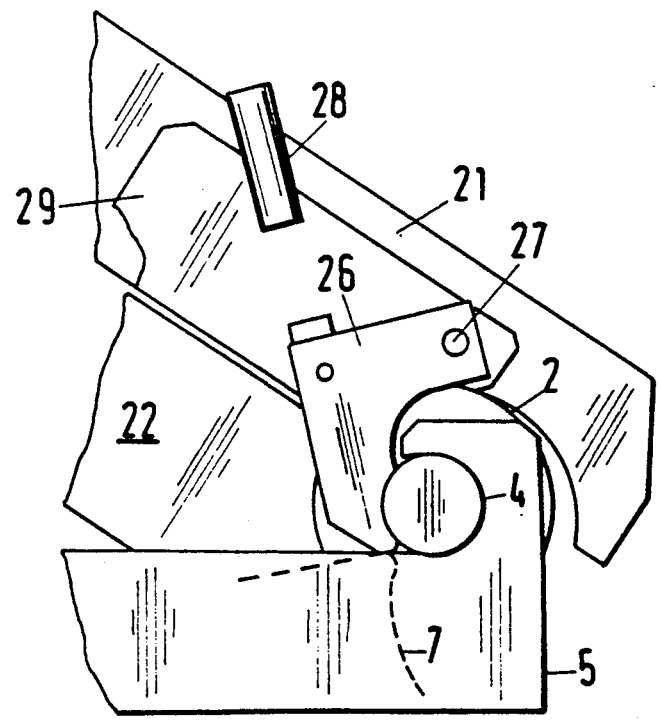
FIG. 5 is a partial side view of a cloth beam bearing according to FIG. 4 but in a different operative position, FIGS. 6a and 6b each show a side view of another embodiment of the invention.

This release position is shown more particularly in FIG. 5, where the drive of the finger 26 is not by way of the gripper 21 but is controlled separately therefrom. A pressing cylinder 28 is diagrammatically shown for this purpose.

Figure 6A:
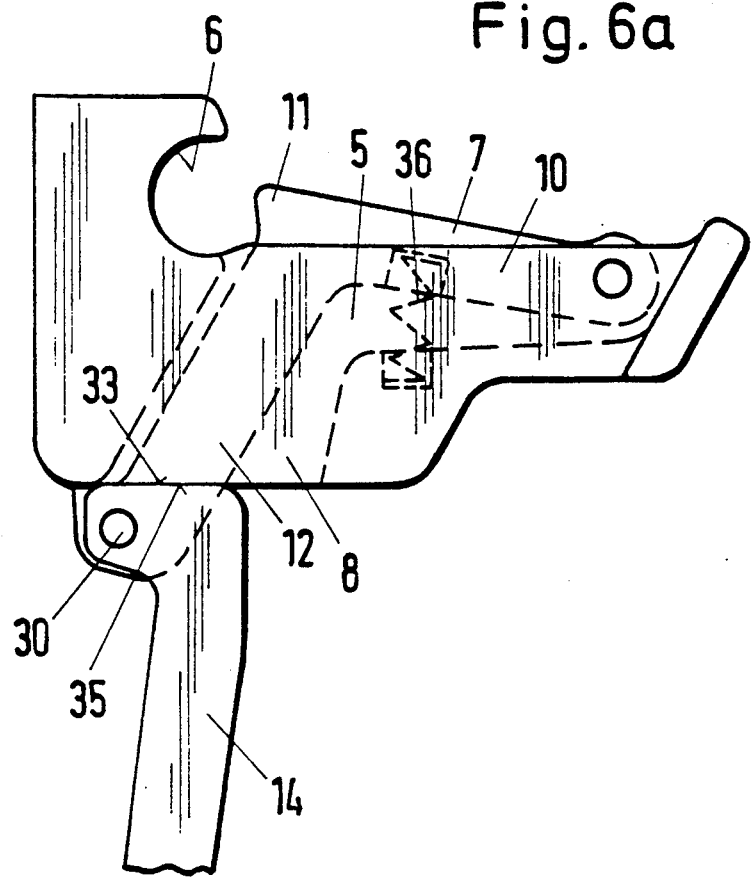
Figure 6B:
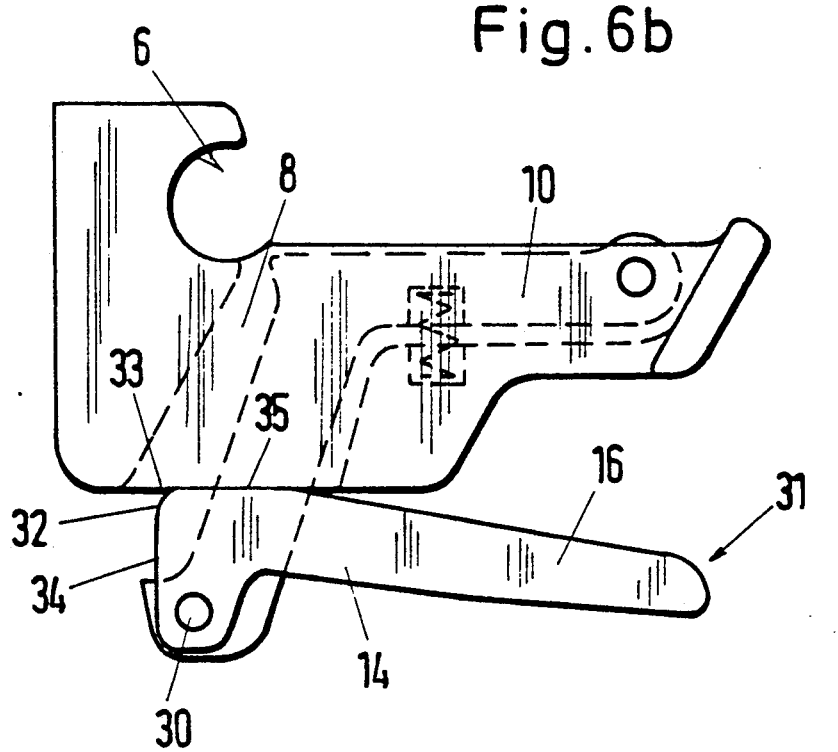

In another embodiment the arm 10, instead of being resilient, has a spring 36 bearing at one end on the arm 10 and at the other end on the table 5. As shown in FIGS. 6a and 6b, the lever 14 can be devised on the table 5 without any place of articulation. In this event the lever 14 is pivotally connected to the arm 12 of the tongue 5 at a place 30 of articulation and has a curved part 32 by way of which the lever 14 can bear on the bottom of the table 5. The curved part 32 is associated with a straight part 33 of the table 5 and the lever 14 has, one before and one after the curved part 32, a straight zone 34, 35 for engaging the straight part 33 on the underside of the table 5, so that the lever 14 when pivoting from the locking position (FIG. 6a) into the release position (FIG. 6b) or vice versa moves from one normal position through a dead center position into a second normal position, contact existing in each case at one place between the straight part 33 on the underside of the table and the curved part 32 of the lever 14.

Referring to FIGS. 7a and 7b the arms 10, 12 and a pedal 14a secured to the arm 12 are a unitary component adapted to be operated by an operative using the pedal 14a. To move the nosing 11 into the release position, a force applied by the operative's foot must act on the pedal 14a so that the nosing 11 can retract downwardly into the recess 8. As shown in FIG. 7b, the second arm 12 moves simultaneously from the locking position V into the chain-dotted release position E and an abutment 12a disposed on the side of the second arm 12 moves into the zone below the recess 8 and into a position in which, through the agency of a second spring element 36a, the abutment 12b is moved to the right together with the second arm 12, the top of abutment 12b being disposed on the bottom edge of the recess 8 and preventing the tongue 7 from pivoting back from the release position E into the locking position V. After cloth beam changing, the nosing 11 can be returned with the tongue 7 and the second arm 12 to the top locking position V when a leftwards directed force is applied to the pedal 14a or second arm 12 against the force of the second spring element 36a. It is sufficient for this purpose, for example, to apply relatively light pressure to the pedal 14a in the direction indicated by an arrow L in FIG. 7b.

FIG. 7c shows another embodiment of the pedal 14b. A component in the form of a lifting stirrup is secured as a second embodiment of the pedal 14b to the bottom of the second arm 12. The advantage of this embodiment is that the second arm 12 can be embodied with relatively reduced resistance to bending transversely of its longitudinal dimension in the plane of FIG. 7c since the force applied to the pedal 14b produces no bending moment in the second arm 12; consequently, the second spring element 36a can be weak and the transverse force needed to be applied to the pedal 14b in the direction indicated by an arrow Q in order to release the abutment 12b also remains reduced.

I claim:

1. A loom having a cloth beam for winding on a woven cloth, the cloth beam having journals received by bearing shells, wherein each bearing shell is rigidly coupled to a stationary bearing table of the loom and wherein each journal is secured in a respective shell by a locking element, wherein the locking element comprises a tongue and a spring for disengaging the locking element and wherein the tongue has two arms, the tongue being mounted at the end of a first arm in a recess, the first arm merging from a nosing into a second arm below the table, and wherein the second arm engages the table from below by way of a support surface.

2. A loom according to claim 1, wherein a lever for locking and releasing the journal (4) from the shell is pivotally coupled to the end of the second arm.

3. A loom according to claim 1, wherein the first arm is boosted by a spring.

4. A loom according to claim 3, wherein the first arm is resiliently deformable and is rigidly connected at one end to the table.

5. A loom according to claim 1, wherein a resiliently deformable element is introduced between the tongue and the table.

6. A loom according to claim 2, wherein the lever has, between an articulation to the tongue and a gripping surface of the lever, a curved part by way of which the lever can bear on the underside of the table.

7. A loom according to claim 6, wherein the curved part of the lever is associated with a straight part of the table, and the lever includes two straight zones located on either side of the curved part, the straight zones being adapted to engage the straight part on the underside of the table, so that the lever, when pivoting from the locking position into the release position and from the release position onto the locking position, moves from a normal position through a dead center position into a second normal position, contact existing in each case at one place between the straight part on the underside of the table and the curved part of the lever.

8. A loom according to claim 2, wherein the lever is pivotally coupled to the table at a place.

9. A loom according to claim 8, wherein, on one side of a point at which the lever is pivotally coupled to the table, the lever is connected by way of a pivot arm to the second arm and, on the other side of the point, the lever includes a grip.

10. A loom according to claim 1, wherein a finger is associated with the tongue and presses the tongue into the recess.

11. A loom according to claim 10, further including a cloth beam extractor, and wherein the finger is positioned in dependence upon the movement of the cloth beam extractor.

12. A loom according to claim 11, wherein the finger is connected to a first gripper of the extractor and is moveable towards the tongue in dependence upon the movement of a second gripper of the extractor.

13. A loom according to claim 11, wherein the finger has its own drive.

14. A loom according to claim 1, further including a pedal secured to the bottom of the second arm and means for locking the second arm in a position, said means including an abutment secured to the second arm near the recess.

15. A bearing for a cloth beam of a loom, said bearing comprising
   a bearing table having a bearing shell for rotatably receiving a journal of a cloth beam and a recess extending from said shell;
   a tongue secured at one end to said table and extending within said recess, said tongue having a nosing facing said shell for slidably engaging a cloth beam journal received in said shell; and
   means for moving said tongue between a first position in said recess to permit movement of a cloth beam journal into and out of said shell and a second position out of said recess to slidably engage said nosing with a cloth beam journal in said shell.

16. A bearing as set forth in claim 15 wherein said means is a lever pivotally mounted on said table and pivotally connected at one end to said tongue.

17. A bearing as set forth in claim 15 wherein said tongue has an arm extending from said nosing through said table, said arm having a support surface for engaging said table in said second position of said tongue to counteract movement of said tongue from said second position in a direction opposite from said first position.

18. A bearing as set forth in claim 15 wherein said means is a lever pivotally mounted on said arm and having a first zone for engaging said table in said first position of said tongue and a second zone for engaging said table in said second position of said tongue.

19. A bearing as set forth in claim 18 which further comprises a spring between said table and said tongue for biasing said tongue from said first position into said second position.

20. A bearing as set forth in claim 17 wherein said tongue is resilient and is rigidly secured to said table at said one end.

21. A bearing as set forth in claim 15 wherein said means includes an arm extending downwardly from said nosing through said table for pivoting therein and a spring between said table and said tongue for biasing said tongue from said first position into said second position.

22. A bearing as set forth in claim 21 wherein said arm has abutment thereon for engaging with said table in said first position of said tongue and a spring element for biasing said arm laterally of said table to move said abutment into engagement with said table in said first position of said tongue.

* * * * *